(12) United States Patent
Corboy

(10) Patent No.: US 7,284,187 B1
(45) Date of Patent: Oct. 16, 2007

(54) ENCAPSULATED DOCUMENT AND FORMAT SYSTEM

(75) Inventor: David Corboy, Newport Beach, CA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 0 days.

(21) Appl. No.: 08/866,857

(22) Filed: May 30, 1997

(51) Int. Cl.
*G06F 15/00* (2006.01)

(52) U.S. Cl. .................... 715/500.1; 715/723

(58) Field of Classification Search ........ 707/513–515, 707/520, 526, 100–104, 512; 345/302; 715/500.1, 715/723, 726, 722, 720, 716
See application file for complete search history.

(56) References Cited

U.S. PATENT DOCUMENTS

| | | | | |
|---|---|---|---|---|
| 5,394,548 A | * | 2/1995 | Nakajima et al. ........... | 718/103 |
| 5,436,898 A | * | 7/1995 | Bowen et al. .............. | 370/352 |
| 5,440,677 A | * | 8/1995 | Case et al. ................. | 345/302 |
| 5,506,983 A | | 4/1996 | Atkinson et al. | |
| 5,541,919 A | * | 7/1996 | Yong et al. ................. | 370/416 |
| 5,586,235 A | | 12/1996 | Kauffman ................... | 395/761 |
| 5,600,826 A | * | 2/1997 | Ando ......................... | 707/103 |
| 5,613,032 A | * | 3/1997 | Cruz et al. .................... | 386/69 |
| 5,615,401 A | * | 3/1997 | Harscoet et al. ............ | 719/322 |
| 5,619,733 A | * | 4/1997 | Noe et al. .................... | 710/61 |
| 5,621,877 A | | 4/1997 | Neumann et al. ........... | 395/326 |
| 5,623,690 A | * | 4/1997 | Palmer et al. ........... | 715/500.1 |
| 5,630,104 A | * | 5/1997 | Ottesen et al. ................ | 703/24 |
| 5,630,132 A | * | 5/1997 | Allran et al. ............... | 718/100 |
| 5,642,171 A | * | 6/1997 | Baumgartner et al. ...... | 348/515 |
| 5,659,793 A | * | 8/1997 | Escobar et al. ........... | 715/500.1 |
| 5,663,962 A | * | 9/1997 | Caire et al. .................. | 370/229 |
| 5,680,619 A | * | 10/1997 | Gudmundson et al. ..... | 707/515 |
| 5,692,205 A | * | 11/1997 | Berry et al. ................. | 707/526 |
| 5,706,504 A | | 1/1998 | Atkinson et al. | |
| 5,715,441 A | | 2/1998 | Atkinson et al. | |
| 5,732,263 A | * | 3/1998 | Havens et al. .............. | 707/103 |
| 5,742,238 A | * | 4/1998 | Fox ........................ | 340/825.49 |
| 5,745,782 A | * | 4/1998 | Conway ................... | 715/500.1 |
| 5,745,910 A | * | 4/1998 | Piersol et al. ................ | 707/515 |

(Continued)

OTHER PUBLICATIONS

Brown, Using Netscape 2, 1995, Que Corporation, pp. 773, 774, 777.*

(Continued)

*Primary Examiner*—Cong-Lac Huynh
(74) *Attorney, Agent, or Firm*—Fish & Richardson P.C.

(57) ABSTRACT

Methods for producing and multiplexing a file format, as well as structures for a hierarchical file format and data file, are provided. The data file may include data that is divided in a hierarchical manner, including a highest level document portion that supports all lower level portions of the data file. The hierarchical data file forms a multimedia document that can be displayed on a computer display with accompanying audio. The multimedia document may include data in a variety of file formats, including image data, sound data, textual data, and video data. At least some of the data is preferably multiplexed in the data file, so that the multiplexed data can be progressively played and displayed as it is downloaded by a computer. Data that cannot be progressively played need not be multiplexed in the data file and can be located in an area of the data file separate from the multiplexed data.

47 Claims, 8 Drawing Sheets

U.S. PATENT DOCUMENTS

| | | | | |
|---|---|---|---|---|
| 5,751,339 | A * | 5/1998 | Aramaki et al. | 348/14.08 |
| 5,758,093 | A * | 5/1998 | Boezeman et al. | 345/302 |
| 5,778,187 | A | 7/1998 | Monteiro et al. | |
| 5,787,440 | A | 7/1998 | Bakke et al. | |
| 5,796,785 | A * | 8/1998 | Spiero | 375/316 |
| 5,798,995 | A * | 8/1998 | Fukushima et al. | 386/98 |
| 5,813,014 | A * | 9/1998 | Gustman | 707/103 |
| 5,822,537 | A * | 10/1998 | Katseff et al. | 709/231 |
| 5,826,102 | A * | 10/1998 | Escobar et al. | 345/302 |
| 5,864,870 | A * | 1/1999 | Guck | 707/104 |
| 5,867,223 | A * | 2/1999 | Schindler et al. | 348/552 |
| 5,892,847 | A * | 4/1999 | Johnson | 382/232 |
| 5,913,038 | A * | 6/1999 | Griffiths | 709/231 |
| 5,923,869 | A * | 7/1999 | Kashiwagi et al. | 713/501 |
| 5,929,857 | A * | 7/1999 | Dinallo et al. | 715/840 |
| 5,935,004 | A * | 8/1999 | Tarr et al. | 463/40 |
| 5,943,046 | A * | 8/1999 | Cave et al. | 715/716 |
| 5,966,121 | A * | 10/1999 | Hubbell et al. | 715/726 |
| 5,969,716 | A * | 10/1999 | Davis et al. | 715/726 |
| 5,983,236 | A * | 11/1999 | Yager et al. | 707/104.1 |
| 5,990,931 | A * | 11/1999 | Nimri et al. | 348/14.08 |
| 5,995,091 | A * | 11/1999 | Near et al. | 715/500.1 |
| 6,061,820 | A * | 5/2000 | Nakakita et al. | 714/751 |
| 6,084,582 | A * | 7/2000 | Qureshi et al. | 715/500.1 |
| 6,084,590 | A * | 7/2000 | Robotham et al. | 345/419 |
| 6,088,507 | A * | 7/2000 | Yamauchi et al. | 386/95 |
| 6,097,380 | A * | 8/2000 | Crites et al. | 715/500.1 |
| 6,097,389 | A * | 8/2000 | Morris et al. | 345/804 |
| 6,100,881 | A * | 8/2000 | Gibbons et al. | 715/500.1 |
| 6,160,907 | A * | 12/2000 | Robotham et al. | 382/154 |
| 6,219,704 | B1 * | 4/2001 | Kim et al. | 709/224 |
| 6,236,805 | B1 * | 5/2001 | Sebestyen | 386/98 |
| 6,243,713 | B1 * | 6/2001 | Nelson et al. | 707/104.1 |
| 6,278,784 | B1 * | 8/2001 | Ledermann | 381/58 |
| 6,381,398 | B1 * | 4/2002 | Yamauchi et al. | 386/52 |
| 6,433,784 | B1 * | 8/2002 | Merrick et al. | 345/473 |
| 6,546,558 | B1 * | 4/2003 | Taguchi | 715/723 |
| 6,628,303 | B1 * | 9/2003 | Foreman et al. | 715/723 |
| 6,640,044 | B2 * | 10/2003 | Greenwood et al. | 386/52 |
| 6,665,835 | B1 * | 12/2003 | Gutfreund et al. | 715/500.1 |

OTHER PUBLICATIONS

Depaoli et al., Coordinator: a basic building block for mulitimedia conferencing systems, Global Telecommunications Conference, 1991, pp. 2049-2053.*

Riedl et al., SuiteSound: a system for distributed collaborative multimedia, Aug. 1993, Knowledge and Data Engineering, IEEE, pp. 600-610.*

Shaw et al., Microsoft Office 6-in-1, Que Corporation 1994, pp. 379-380, 384-389, 396-402, 419-425, 492-496.*

Ossenbruggen et al., Music in time-based hypermedia, ACM 1994, pp. 224-227.*

Ackermann, Direct manipulation of temporal structures in a multimedia application framework, ACM 1994, pp. 51-58.*

Ackermann, Direct Manipulation of Temporal Structures in a Multimedia Application Framework, ACM 1994, pp. 51-58.*

* cited by examiner

ENCAPSULATED DOCUMENT AND FORMAT SYSTEM

BACKGROUND OF THE INVENTION

1. Field of the Invention

This invention relates to producing a data file having different file format elements encapsulated within the data file. More particularly, the present invention relates to a data file in which different types of data, such as video and sound, are stored in a unified encapsulated format that can be repeatedly assembled, stored, and sent.

2. Description of the Related Art

Modern computer files may include parts representing various kinds of information. The parts are specially coded to represent the information. Moreover, each set of bits in modern computer files is coded in a unique way to represent a unique kind of information. For example, the ASCII coding system assigns a bit sequence to each alphanumeric character of the ASCII set. That bit sequence represents the character, however, only if one knows that it is ASCII.

Bits can also be used to represent image and sound data. For example, image data may be represented in BITMAP format, or in various compressed image data formats. The set of bits itself, however, has no meaning unless one knows the format. The ASCII code for a particular alphanumeric character could equally well represent a sequence of sound, or a portion of an image. Different kinds of files are used, therefore, to transfer different kinds of information.

It has become highly desirable to transmit different kinds of information, such as graphics, video, and/or sound, over a channel to a user. A so-called multimedia document includes different kinds of information. One example of a multimedia document is found in hypertext markup language (HTML) encoded format on the worldwide web. This information is a document in the sense that, once downloaded, a document-like image appears on the computer display. (As used in the remainder of the description, the term document is to be construed broadly to incorporate data files that include text, images, and/or other information that can be presented on a computer like a printed document.) The display shows rich text (i.e., text that is coded in terms of its size, color, and font) as well as images located at different locations within the document. A worldwide web downloaded document can also include sound.

The various kinds of information in a multimedia document are each formed from a separate file that includes instructions about where the pieces of the document should go. For example, an HTML document includes rich text information, along with commands to insert additional information. Such additional information, typically GIF or JPEG image files, is separately downloaded and inserted into the text of the document.

The original format for downloading HTML documents displayed the formed document only when it was completely downloaded. While modern enhancements allow portions of the image to be displayed while downloading, most do not allow playing of the sounds added to the download until the sound file is completely received.

The download of HTML documents cannot be sequenced or choreographed, because information is downloaded as it becomes available. For example, if the document includes multiple images, they may come in any order. Moreover, actions may not be choreographed with image download or with text download.

It is difficult to save an HTML document, because the document is a text document that includes commands for additional images. The images are not part of the HTML document, but rather separate sub-documents. The perceived display of an HTML documents is thus assembled from separate downloaded pieces of information. HTML documents cannot be easily saved, however, because no connection exists between the various pieces of information and the various sub-documents. Moreover, HTML documents cannot be easily reassembled or resent. While proposals do exist for "encapsulated" HTML that would allow an HTML document and its component parts to be concurrently saved for later viewing or forwarding, these proposals suffer from a variety of restrictions, and none would allow for data to be choreographed by the author. For the remainder of this description, choreographing will refer to allowing a document author to select or define the relative times at which various document components, such as images, text, or sound, are played or displayed by a computer.

SUMMARY OF THE INVENTION

The present invention provides a system and method for forming document files as well as a file format, each of which can include integrated information. The information is stored in a special form that allows parts to be viewed while forming the file.

Preferably, all of the information, of all of the different kinds, is stored in the file in a unified, encapsulated format. In an encapsulated document, therefore, the data defining the document is integrated into a single file containing the data and having an overall format defining the document. As a result, the file can be repeatedly stored and sent, because the encapsulated format facilitates keeping the file structure intact after the user has viewed the file.

Alternatively, only the formatting data may be contained in the document encapsulation (i.e., the size, position, and other display characteristics of the document, irrespective of the actual document data). The actual document data could then be stored in and retrieved from an external source, such as an URL, an HTML document, or a cache, or from another source, such as a CD. The user can still save and resend the encapsulated document, without the problems of HTML, as the document data can be retrieved from the external sources and encapsulated into the document.

The invention can multiplex different forms of different data together. The multiplexed data is in a streaming format, also known as a progressive rendering format, especially when dealing with image formats. The streaming format data, once downloaded, causes the display to change on an incremental basis. Further downloading occurs simultaneously with the displaying of the file.

Certain kinds of data images may be in a non-streamable format. For example, images that are not susceptible of progressive rendering cannot be sent in a form that facilitates updating user perception on an incremental basis. The preferred mode of the invention, however, updates user perception of the displayed data whenever available.

It is another object of the present invention to provide a system that permits a number of different file formats to be encapsulated in a way that enables choreographing between the file elements.

Special techniques of the present invention are used with so-called temporal data. In the present specification, temporal data includes data that must be presented to the user during a specific time span, for example, sound files. Once a sound file begins playing, it should be played uninterrupted to avoid an unnatural feel to the sounds. The temporal operations of the present invention are used as part of the choreography. This encapsulated data format is especially advantageous when combined with the special modules of the present invention that are described in this specification. The present invention recognizes temporal data objects and creates a multiplexed format in which temporal presentations are accurately conveyed to the user.

In a first embodiment, the invention is a method for producing a hierarchical data file for a multimedia document. The data file has different file formats encapsulated within the data file. The method includes several steps: (a) encapsulating in a multimedia document a first file support object including information in a first file format; (b) supporting the first file support object by the multimedia document; (c) encapsulating in the multimedia document a second file support object including information in a second file format different from the first file format; and (d) supporting the second file support object by the multimedia document.

In another embodiment, the invention is a hierarchical data file structure that encapsulates different file formats to form a multimedia document. The multimedia document is capable of being displayed on a display of a computer system. The data file includes a document that includes information for controlling the display. The data file also includes a first support object including information in a first file format. The first support object is encapsulated in the document and is capable of supporting first lower objects. Each first lower object is a lower level object than the first support object in the hierarchical data file structure. The data file also includes a second support object including information in a second file format different from the first file format. The second support object is also encapsulated in the document and is capable of supporting second lower objects. Each second lower object is a lower level object than the second support object in the hierarchical data file structure.

In still another embodiment, the invention is a method for encoding a framed image in a frame to be included as part of a multimedia document. The multimedia document encapsulates data in different file formats and is capable of being displayed on a display of a computer, which includes a player. The method comprises: (a) placing an image into the multimedia document; (b) receiving information about the image by the player; (c) decoding the image information; (d) sending the decoded image information to the multimedia document; and (e) enclosing the decoded image in a frame in the multimedia document.

In another embodiment, the present invention is a method for multiplexing data in a multiplex message that includes data in different file formats. The file formats are selected from a group of file formats including a textual format, an image format, and a sound format. The multiplex message forms at least a portion of a multimedia document and includes object files, each object file being represented by at least one data slice. The method includes providing an object number counter in the data file indicating the number of object files following the object number counter in the data file. The method further includes providing object descriptions, each object description describing a corresponding one of the object files. The method also includes providing a choreography group including the data slices of the object files interleaved in a predetermined manner.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

I. System Architecture

Figure 1:
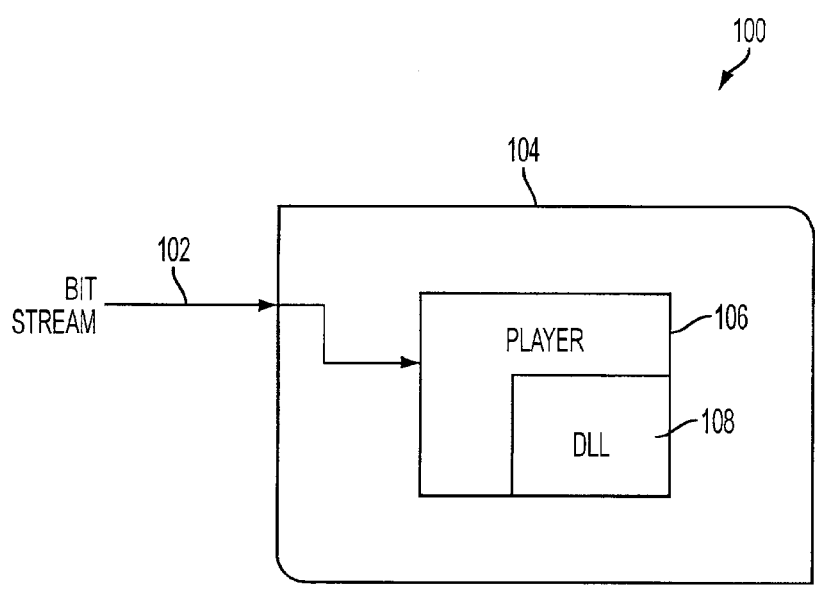
FIG. 1 is a block diagram showing a system architecture of the present invention.

The overall system architecture 100 of the invention is shown in FIG. 1. A bit stream 102 is input to the system 100. The input bit stream 102 represents a new special data format that is referenced in this specification as the "ART Format." The ART Format is an encapsulated data format that includes various types of data.

The bit stream 102 is input from an overall information provider 104, for example, an Internet provider such as America OnLine®, to the input function of a player wrapper 106 as the bit stream 102 is received. The player wrapper includes a player dynamic link library (DLL) 108. The player DLL 108 separates and commands play of the various information in the bit stream 102. The playing is carried out using a technique known as "ART DOC Extensions," which is also embodied as a DLL. Although the playing systems are described as being embodied as DLLs, the playing systems alternatively could be embodied as dedicated hardware components, e.g., digital signal processors. Other examples of the player wrapper 106 include a Netscape or ActiveX plug-in. Player wrappers 106 can also allow editing and creation of multimedia documents.

A module of the player wrapper 106 may use a plug-in, rich text format text processor. The preferred plug-in text processor is Paige™, commercially available from Datapak, Inc. Paige™ carries out many different operations and allows other modules to tell Paige® what operations to perform what ways. Paige™ can respond to commands to use various fonts, place text within a multimedia document, and reserve other places within the document for other items, such as image data or video. It will be understood, of course, that alternate software packages and systems could be used.

The Paige™ text processor may perform the displaying of the document. In such a case, Paige™ communicates with a currently selected window on the computer display.

The preferred framework of the present invention includes various overheads, such as clipboard, command stacks for undo, and other well-known overhead systems.

II. Construction and Features of an ARTDOC Document

Figure 2:
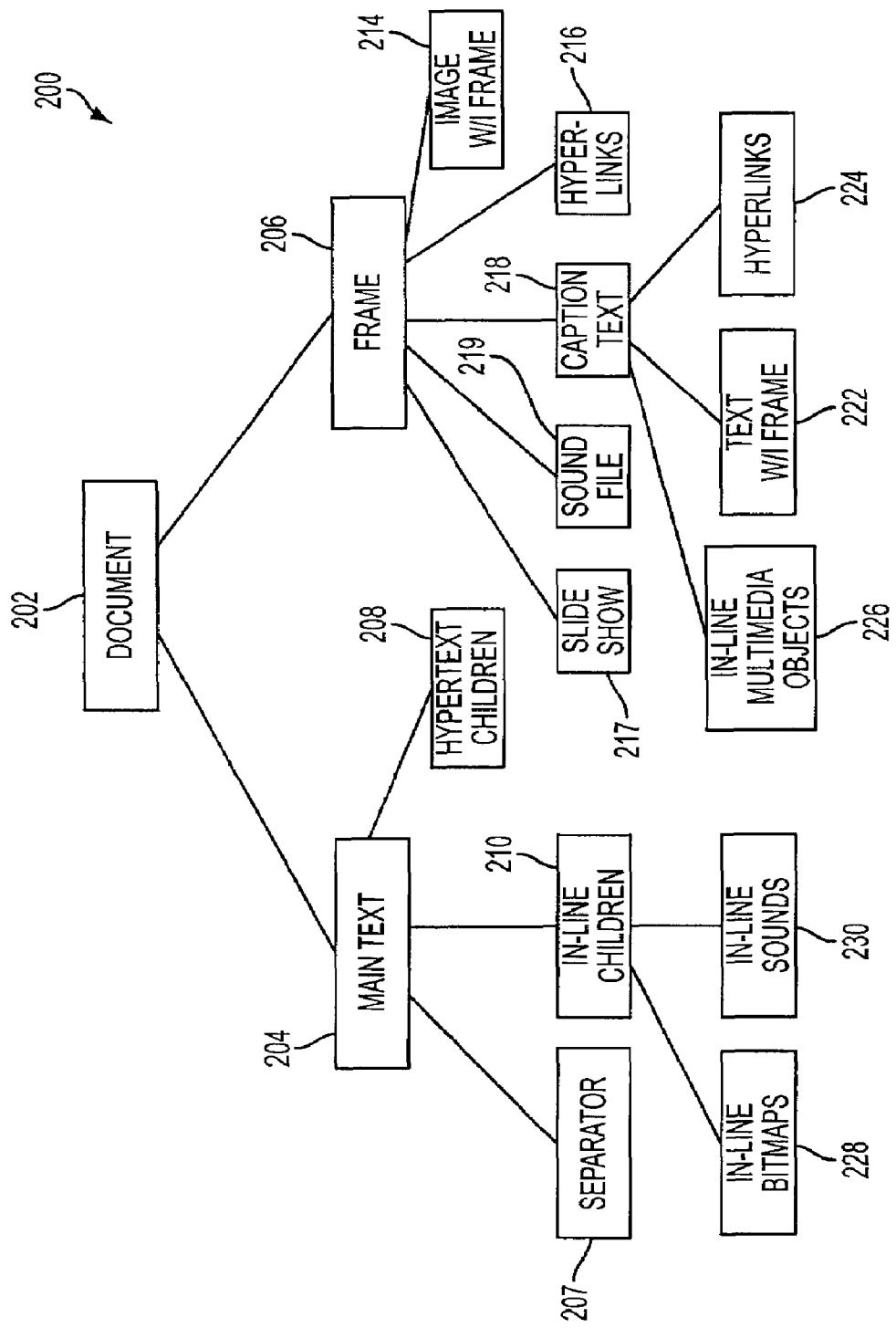
FIG. 2 shows the overall hierarchy of the layered parts of a document, including the hierarchy of a framed image.

The multimedia document is ordered as a series of layered parts. FIG. 2 shows the overall hierarchy 200 of the layered parts of a document (referred to herein as an "ARTDOC document") in accordance with the present invention. The highest layer of the ARTDOC document is the document object 202. The document object 202 controls information for the entire active display window, including commands for background colors and enclosing windows.

Each document portion has a capability of supporting "children," which are subspecies of the ARTDOC document. The document object 202 shown in FIG. 2 supports two children—a main text object 204 and a frame object 206. The main text object 204 can include other children, including separator children 207, hypertext children 208, and in-line children 210. The hypertext children 208 can include links to other documents, which can be ARTDOC document images or any other document. The in-line children 210 can include in-line bit maps 228, sounds 230, or other multimedia objects, which can be displayed as part of the ARTDOC document. The separator children 207 may provide visual lines to separate text.

The frame 206, as shown, also includes a number of children. For example, the frame 206 includes an image 214 within the frame 206, hyperlinks 216 regarding the image 214, a sound file 219, and a slide show 217. The framed image 206 may also include caption text 218, which may also include text within a frame 222, hyperlinks 224, and in-line multimedia objects 226 like the main text object 204.

Figure 3:
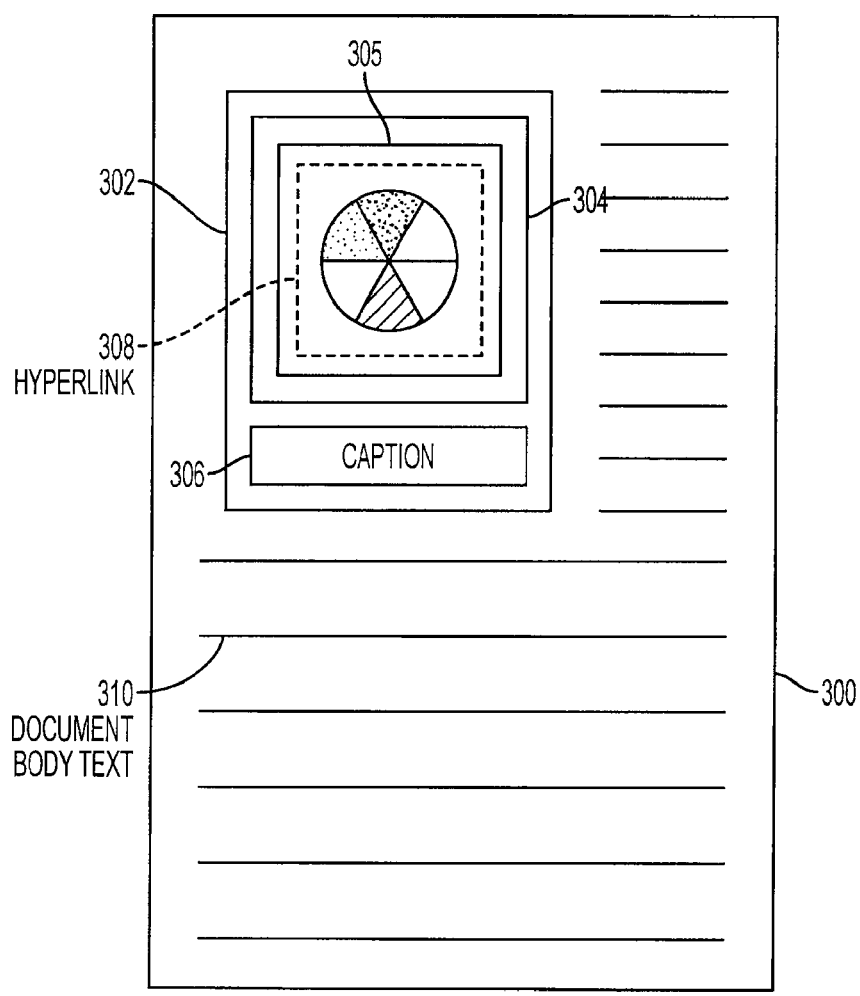
FIG. 3 shows an overall display of a multimedia document formed according to the hierarchy of FIG. 2.

FIG. 3 shows an overall display for an ARTDOC document 300 formed according to the hierarchy of FIG. 2. A number of objects may be embedded within the document 300, along with text 310. The Paige™ word processing program, as part of its function, controls wrapping of lines, etc., around the images displayed in the document 300. Paige™, as now commercially available, allows its areas to be set-up and controlled. Paige™ also allows certain areas to be defined that are not Paige™ areas, for example, an image and/or its caption.

The system according to the present invention uses these Paige™ capabilities to create an exclusionary area 302 within the document 300. A frame object 304, in this case including an image 305, is located within the exclusionary area 302, which effectively forms an invisible frame around the frame object 304. The enclosed objects can include framed images, slide shows, framed text, sounds, separators, and hyperlinks, which are all described in detail below.

A similar operation is carried out for the captioning operation, by which a caption 306 is placed adjacent the object 304, but within the exclusionary area 302. In this example, a hyperlink 308 is positioned over the graphical image 305. The hyperlink 308 may be an area of the image object 305 that one can select, for example, by a mouse click, to determine something else about the image object 305.

The hierarchical structure 200 of FIG. 2 facilitates moving positions of objects within the ARTDOC document. Each object within the ARTDOC document is formed of a number of objects and sub-objects. The sub-objects are children of the objects. The hierarchical system 200 according to the present invention, as described above, allows a higher level object to be moved together with all of its lower level objects (i.e., sub-objects). In the example of FIG. 2, frame 206, image 214, hyperlinks 216, and caption text 218 (with its children, text 222, hyperlinks 224, and in-line multimedia objects 226) are moved together with the frame 206 when it is moved. Therefore, for example, moving a frame will move not only the image within that frame, but also the hyperlinks and text within the frame. This same operation can be used with a delete command. Deleting the frame object deletes the frame, the image, the hypertext, and all of the other associated parts.

Each action (e.g., a move command) is passed to the object, and the object decides what to do with that action. Thus, for example, to move a frame 206, a mouse operation is used to move the position of the frame 206 from a first position to a second position. The mouse operation is handled in the standard way by the operating system, which hands off the new position to the player 106. The player 106 then passes this new position to the core DLL 108, which passes it to the object. Now, the object knows not only its new position, but also the new relative positions of all the sub-objects within the object.

The ARTDOC document supports a number of different objects. In general, three types of objects exist: those with a visual representation, those with an audio representation, and those with specialized functions. Examples of objects with visual representation include images, which are generally static bitmaps. Objects with audio representation include digitally sampled sounds, which may be WAV or AIFF files, and MIDI files, which are usually played through an FM synthesizer. Specialized objects include frame objects, separator objects, and hyperlink objects. Frame objects hold multimedia objects, such as images, sampled sounds, and MIDI files, and also may provide a visual representation of the document. Separator objects provide a visual horizontal line (of different styles) that either separate paragraphs of text (moving with the text as it is reformed), or may exist at a geometrical position in the document. Hyperlink objects allow navigation to other content described by the author of the document. The present invention also supports ART file objects, which are described in copending U.S. patent application Ser. No. 08/755,586, assigned to the assignee of the present application. ART file objects include slide shows, sound and picture objects, ART sounds, and ART images. Any type of document can be contained inside an ARTDOC document by creating an ARTDOC extension module for the object.

Each object may include some kind of command for perception. Typically the perception of the object will be displaying of video or listening to sound. The command for perception will be a command indicating the kind of player that is used to produce the perception. If the player is not resident in the playing computer, various steps are taken as described herein.

In addition, each object may be able to pass and receive messages and to supply and retrieve its data. As an example of these functions, suppose the author wants to create an ARTDOC document that includes a video object (which includes image and audio portions) from a third party library. The library for the video object is "wrapped" with an ARTDOC document module, effectively creating an ARTDOC extension. This "wrapper" module allows the ARTDOC system to communicate with the third party library so that it can become part of the ARTDOC document. The wrapper module provides the translation layer and interprets and provides messaging between the ARTDOC document and the third party library. Referring to FIG. 1, as the data stream 102 is received, the data stream meant for the video object is extracted and passed to the ARTDOC video object that wraps the third party library. The wrapper module then passes the data to the library, which interprets the data. The ARTDOC document cannot interpret the data, because it only carries the data. The library then interprets the data and provides, for example, a new video image and sound bite back to the wrapper module. The wrapper module, in turn, communicates back to the ARTDOC document, which displays the image at the proper place in the document. The video object may communicate with sound hardware directly to provide the sound. The system may work in this manner for all objects, including the text that is passed to the rich text processor and the data that is passed to the player 106.

When authoring an ARTDOC document, the user may produce some text using the Paige™ system. Paige™ will place the text on the computer display according to the desired type of rich text characteristics. Now, if the user wants to place an image within the ARTDOC document, the user employs a mouse, for example, to drag and drop the image into the ARTDOC document. The computer operating system that controls and monitors mouse operations passes the new information indicative of the mouse information (e.g., the drag and drop information) into the document 202 shown in FIG. 2.

Figure 4:
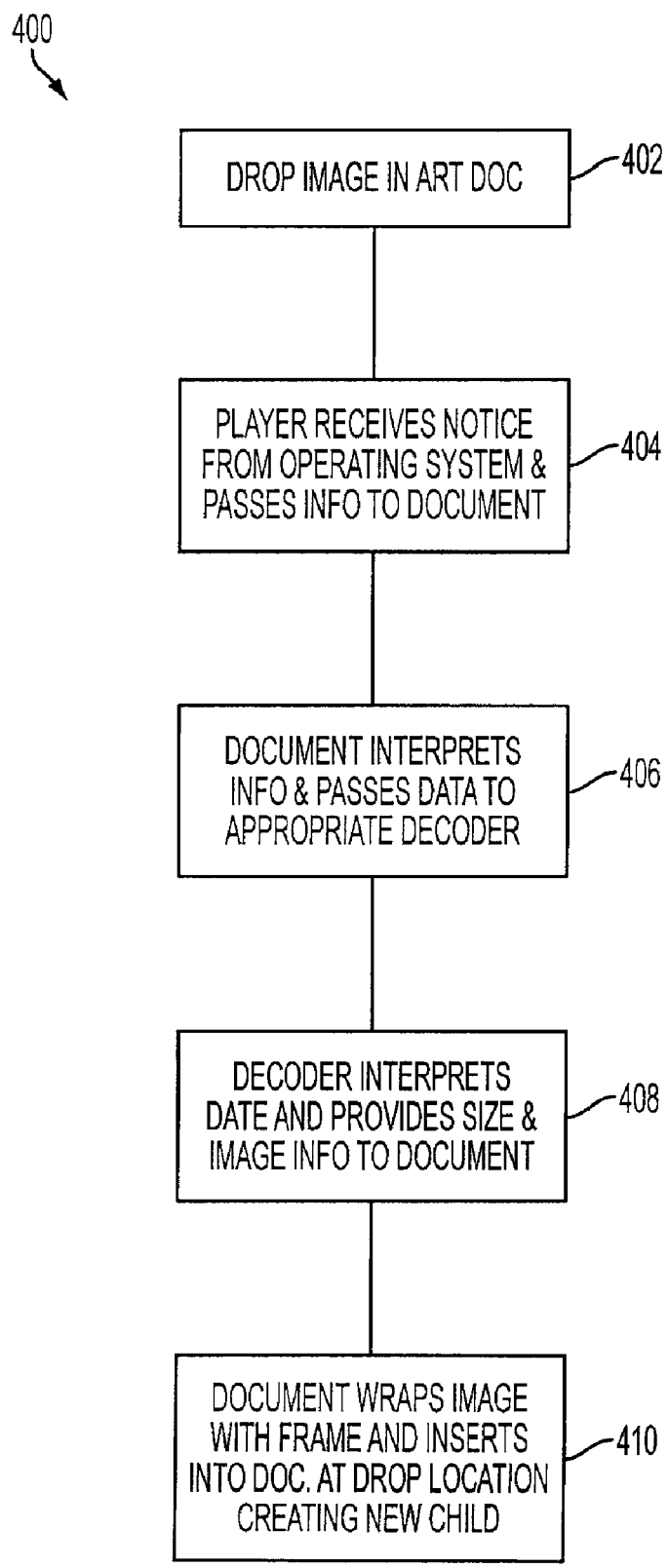
FIG. 4 is a flow diagram showing the steps by which a code segment receives image information.

The document 202 forms a code segment that receives image information according to the flow diagram of FIG. 4, which constructs the particular frame 206. The process 400 begins at step 402, where an image, e.g., a GIF image, is dropped into an ARTDOC document. The operating system sends information about the image to the player wrapper 106, which notifies the ARTDOC document at step 404. The information itself is then passed to a decoder at step 406. The decoder determines the data format (here GIF) and provides size information and visual representation back to the ARTDOC document at step 408. The ARTDOC document encloses the image in a frame and adopts the component object as a new child in step 410. The position of the ARTDOC document may be given by the original operating system mouse location.

An important feature of the present invention is that the objects forming the images may be generic. Thus, all objects have the same characteristics and can be connected together to form parts of the ARTDOC document. The preferred items forming the objects include a framed image, a slide show, framed text, sound, a separator, and a hyperlink. Each of these will now be described in detail. Many of these objects may be provided by the player 106 as an ARTDOC document extension.

Frame objects (e.g., frame 206) are containers that perform several tasks in an ARTDOC document. First, and most significantly, they define the exclusionary areas within the page around which the text will wrap. Second, they contain the multimedia types described above, i.e., images, sounds, video, etc., or text objects, thereby creating framed text objects. Each of these multimedia types and text objects may also have further children, as described above. Finally, frame objects may provide a visual representation as an enclosing border at the author's option. Examples of visual representation options are color, thickness, pen style, outer margins, and three-dimensional effects, which can be fully implemented by the ARTDOC document.

Image objects (e.g., image 214) have an original size and provide a static visual representation. The author may override the original size. Image objects may be contained in frames or may appear in-line in a block of text and may be provided by the ART player 106 as an ARTDOC document extension.

Sound objects do not have a size, but are given the appearance of a sound icon if they are authored without a visual component. Sound objects may be contained in frames (e.g., sound file 219) or appear in-line in a block of text (e.g., in-line sound file 230). Sound objects may be of the sample wave type or of the sequenced MIDI type. Sound objects may be played by clicking on the visual representation or by other direction of the user and may also be provided by the ART player 106 as an ARTDOC document extension.

Sound and picture objects are a combination of a sound component and an image component, giving the visual representation of an image, but allowing the sound to be played when clicked. Like sound and image objects, sound and picture objects may be provided by the ART player 106 as an ARTDOC document extension.

Non-static multimedia objects include slideshows (e.g., slideshow 217) and video, as well as any similar moving-image-with-sound type of representation. Non-static multimedia objects are displayed as an image (optionally with a title page, if supported) until the user clicks or directs the object to be played, which results in a changing image, usually accompanied by sound. These objects may also be provided by the ART player 106 as an ARTDOC document extension.

Textual objects may appear in a frame (sometimes referred to as framed text objects, e.g., text 222); they may also appear in the form of the main body text (e.g., main text 204) and as captions for images (e.g., caption text 218). Text objects flow within the boundaries of the enclosing object and are stored in the file as an RTF data stream with embedded hyperlinks. Textual objects are implemented as an ARTDOC wrapper around the Paige® text processor.

Separator objects (e.g., hypertext 208) are used to provide a visual separation between paragraphs of text or other objects. Separator objects allow all the visual representation options as do frames, but do not contain objects. Separators are often used with "Anchor" geometry, which will be described below. Separator objects may be fully implemented by the ARTDOC document itself.

Finally, hyperlink objects (e.g., hypertext 208) are associated with any of the multimedia object types (images, sounds, slideshows, etc.) or with textual objects. When associated with multimedia objects, the hyperlink is described as a geometric (preferably rectangular) region on the associated object. When associated with text, the text appears visually different according to the author's specification. The user receives feedback when moving the mouse over a hyperlink region or hyperlink text, which includes a description of the location to which the hyperlink points. When the user clicks on the region or text, the appropriate information is retrieved and displayed for the user, or the user is taken to the location designated by the hyperlink pointer. Hyperlink objects are also fully implemented within the ARTDOC document.

The architecture of the ARTDOC document of the present invention is fully extensible, meaning that the document will support any kind of multimedia object. This includes image, sound, video, and text stream object. With any multimedia object, the data for that object will be delivered and progressively displayed or played.

The "geometry" of an object refers to the specification for the dynamic positioning of the object within the bound of its parent or controlling object. Any visual object in an ARTDOC document has four edges: left, top, right, and bottom. The boundaries of such an object can be fully determined by applying a single "rod," "spring," "measure," or "anchor" to each edge. A rod is a fixed delta in parent coordinates from an edge of a child object to the same edge of its parent object. A spring is a percentage of the parent's total width or height from which the position of the child's edge should be determined. Springs calculate from the center of the object when paired with a measure; otherwise, the position of each edge is calculated independently. An anchor is a fixed delta in parent coordinates from the bottom edge of the first character of a paragraph to the top edge of a child object. A measure is the length of an edge (width or height) of an object and is used to fix the width or height.

The most common geometry is that of a fixed-position object that is described using a rod for the top and left sides of the object and a measure from the bottom and right sides. An object with this geometry retains its relative position form the top, left corner of the controlling object (in this example, the parent document) and also does not change size when the document is resized. An object with horizontal centering geometry is created by using a spring (set at 50%) for the left edge and a measure for the right edge. This causes the position of the object to move as the document resizes (remaining in the center), but still does not change the size of the object.

Other applications may include a geometry that attaches an object to the right edge of a document by using a left-edge measure and a right-edge rod. Allowing an object to grow with the document is also supported by attaching rods to both sides and not using measures, thus removing the fixed-measure constraint.

The anchor geometry setting allows an object's vertical position to be dependent on the position of a block of text. This setting is most often used with separators to ensure that they remain between the blocks of text that they separate, but can be used with any object.

III. The ARTDOC Document File Format

Figure 5:
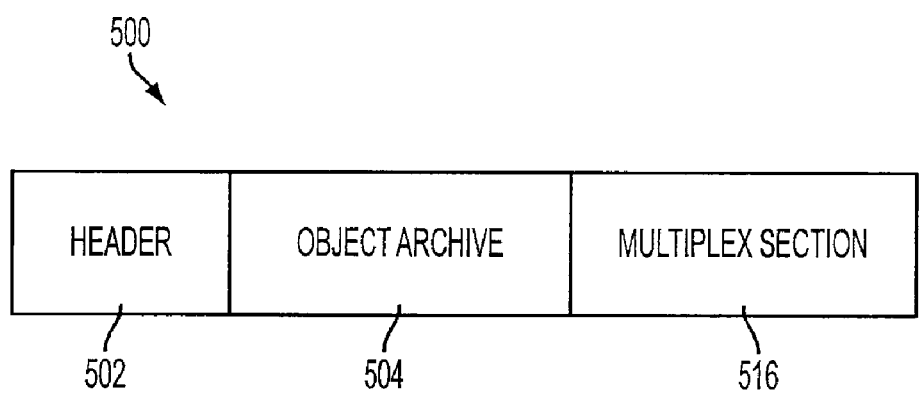
FIG. 5 shows a file format of the present invention.

FIG. 5 shows the preferred ARTDOC document file format 500 of the present invention, which includes a header area 502, an object archive 504, and a multiplex section 516. The header area 502 includes typical header information, such as start bits and version number, and any other overhead information.

The object archive 504 follows the header area 502 in the file format 500. The object archive 504 stores object information, but does not store the data associated with that information. The object archive 504 includes the information from the hierarchy of FIG. 2. Each element in the hierarchy 200, from top to bottom, is used to provide an explanation of the information about each element of the hierarchy and its children. In the preferred embodiment of the present invention, the document is traversed in a "depth-first" manner, meaning that the layout and attributes of each element of the document are provided in the object archive 504. Consequently, the object archive will include information about the geometry (layout, position, and size, as described above) of the document, as well as complete descriptions of the document attributes, such as the frame.

The object archive 504 is the first information received by a receiving element. Hence, the receiver can display layout information about an ARTDOC document as soon as the receiver has received the object archive 504. As explained above, however, the data to fill that layout is not received with the object archive 504.

The invention may have several features and requirements. First, the invention may allow a first portion of an object's data to be a splash or "miniature representative rendering" of the object. Whether an image has a splash is determined by the particular format of the object in question. The splash data, if present, appears at the front of the image stream in order to provide the splash early in the download. The splash image indicates some very coarse information about the content of the multimedia objects in the ARTDOC document. The splash information is progressively updated as more data arrives that describes the images. More items of image information can be provided to the object to display more information. Text can also arrive and be displayed.

The data for each of the multimedia objects (e.g., images, sounds, text streams, or video) is delivered in the multiplex section 516 of the ARTDOC file 500. The data is generally the same data that would be resident in a file containing the object alone, without any of the geometry and attribute information, as this information is contained in the object archive 504. The multiplex section 516 represents the bulk of the data stream.

In the multiplex section 516, data is interleaved together according to the "choreography" of the document. The term choreography, as used herein, refers to the ordering of the multimedia objects in the ARTDOC file format. When objects, such as images, are designated to appear during the same time interval, their data is interleaved together in the multiplex section 516. As the ARTDOC file 500 is received, the interleaved data stream is decomposed, and the appropriate data is delivered to each object, progressively updating each object's visual appearance in the display of the ARTDOC document.

Some classes of objects, however, are not interleaved with other objects in the multiplex section 516, regardless of the author's choreography designation. The first class includes those objects that cannot be progressively rendered. MIDI files and most standard types of audio and video files are examples of this class of objects. Because these objects must be completely downloaded before they can be interpreted, no benefit flows from interleaving their data. The second class of non-interleaved objects includes files that are designed to be played back progressively, but that are authored for a particular bandwidth. These objects are referred to as time-based or "temporal" files. Examples of such temporal files are certain audio and slide show files that cannot be interleaved with other data without slowing the delivery of their own temporal data and risking starving their players of data.

The classes of objects that are not interleaved are detected by the ARTDOC document and are placed in their own choreography groups within the multiplex section 516. These groups may be arranged with interleaved multiplex groups without degrading document playback, as interleaved and non-interleaved groups do not overlap.

By interleaving certain data, such as images, and separating temporal files, the present invention permits the incremental "display" of the document (including sounds and images) to the user. As described above, images can be multiplexed or mixed together so that they arrive and are displayed at substantially the same time. The constraints of narrow-band, i.e., modem communication, however, generally prevent interleaving of the temporal objects; the quality of their playback would likely suffer if they were arbitrarily mixed together. None of the proposed encapsulated formats for HTML allows such an incremental display and do not allow for the proper organizing of temporal information for narrow-band applications. The proposed HTML formats rely on broad band communication, meaning that these formats may arbitrarily mix the data, regardless of the type of data, and may sequentially store objects, sacrificing either the audio or video presentation of the HTML document.

It is known that particular object data, such as text streams, may not be compressed. The ARTDOC document can compress such data itself into the multiplex section 516. If this is done, the compression flag (see reference numeral 708 of FIG. 7) is set.

An unknown object is a special type of object within the ARTDOC format. The unknown object is an object that probably has a defined player, but the computer receiving the unknown object does not recognize the defined player. The unknown object includes the information contained in the object archive 504 (described above), because the unknown object is a type of object. Therefore, the receiving computer knows where this information is and how large it is. Hence, the player 106 can draw the outlines of the unknown object, without putting the particular details in it. At least some of the data from the multiplex section 516 is provided to the unknown object, which displays an "unknown" icon. Although that data cannot be displayed, it can be carried around by the file embodying the unknown object, and the file can be saved intact. Moreover, later downloads of coded information can be made to allow playing of the unknown object. For example, the unknown object may reference a DLL of which the playing system 106 has no knowledge. Later download of the DLL may allow later display of the unknown object.

The ability to support unknown object types also allows the use of user-defined object types. So long as the object type follows the conventions given above, it can be made into part of the ARTDOC format, and encapsulated within the ARTDOC document.

IV. The Multiplexed Scheme

The preferred embodiment of the present invention uses a multiplexed scheme, as noted with respect to FIG. 5. The multiplexed scheme preferably employs "slices" of information. Each slice represents a piece of information that can make some degree of difference in the perceived ARTDOC document. A slice may be a segment of audio between any two natural pauses in the audio, a piece of an image that causes a further update of the image, or a block of text.

Figure 6:
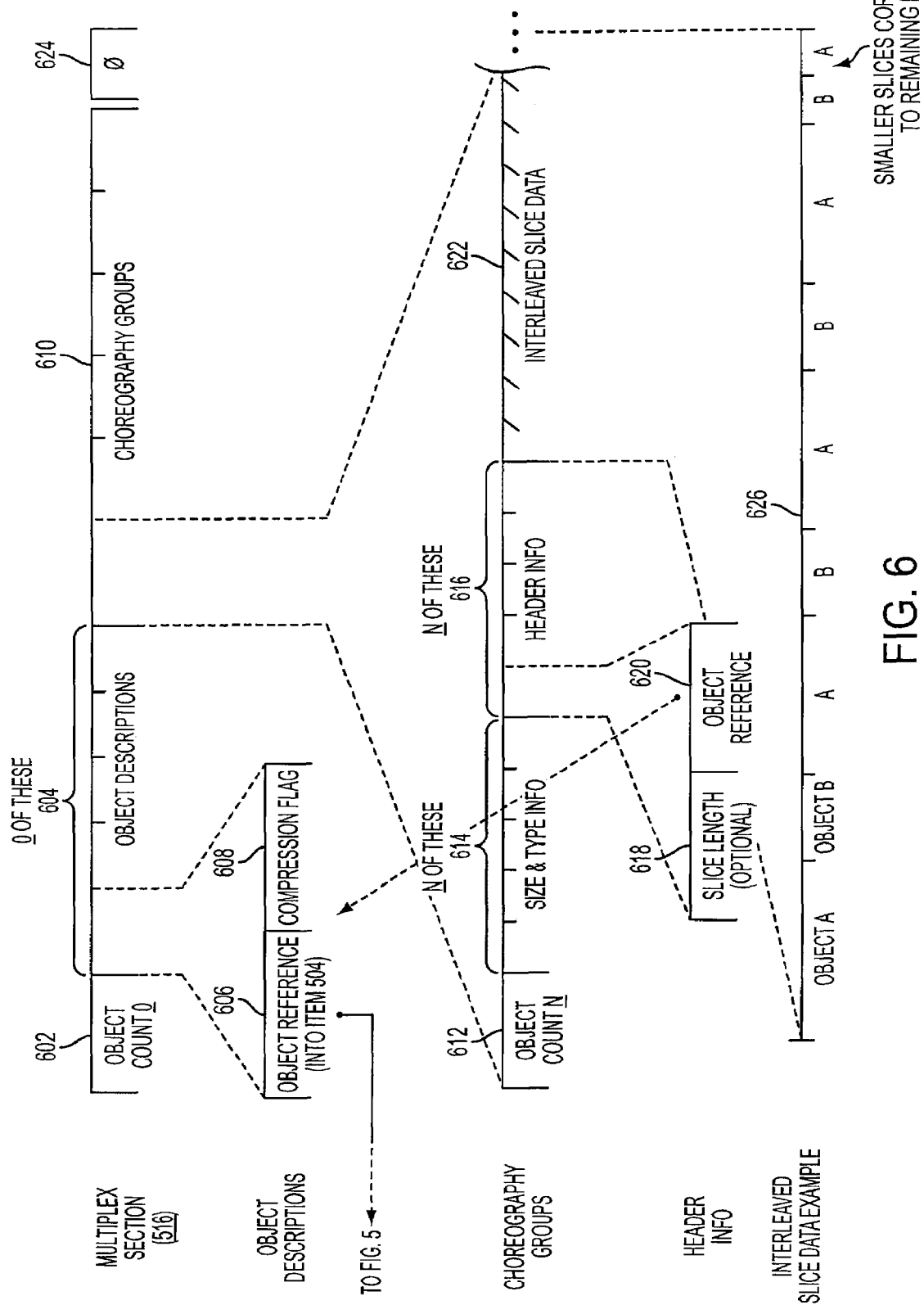
FIG. 6 shows a multiplexed scheme in accordance with the invention.

FIG. 6 shows the preferred multiplex message 516 in accordance with the multiplexed scheme of the present invention. The multiplex message 516 includes an object number counter 602. The object number counter 602 includes an indication of the number of "objects" that will follow in the object section of the multiplexed information.

Object descriptions 604 follow the object counter 602. The object descriptions 604, being of the same number as the object number counter 602, include an object reference 606 that provides a back reference to the object information stored in the object archive 504 and a flag 608 indicating whether the object data was compressed by the ARTDOC document.

Following the object descriptions 604 are choreography groups 610. There may be any number of choreography groups 610 (as described below) corresponding to the ordering of interleaved data within the document. When no further groups exist in the multiplex section 516, a single zero-byte 624 is used to mark the end of the multiplex section 516.

A choreography group 610 includes an object counter 612 that indicates the number of objects contained in the particular choreography group 610. Objects may appear in different groups, providing a portion of their data from within each group. Following the object counter 612 is a section 614 providing the size and type information for each object in the choreography group 610. The size and type section 614 provides an internal characterization of the multiplex data as well as the total length of the multiplex data for the object contained in this particular choreography group 610. An object header information section 616 follows the size and type information section 614. The object header section 616 includes a section 618 that contains the length of the object's data slice within the group 610 and an object reference section 620 that provides a back reference to the object's description 604. The data slice length section 618 is an optional parameter, because, if only one object is contained in the group 610 (i.e., the object counter 612 indicates "1"), the slice length is assumed to be the same as the length information provided in size and type section 614.

The actual interleaved data 622 follows the object header information 616. The interleaved data 622 constitutes the bulk of the information included in the choreography group 610 and includes the data destined for the referenced object. The interleaved slice data 622 is preferably provided as a series of raw data bytes. The length of the interleaved slice data is given by the data slice length section 618 for each object in the choreography group 610. Each object supplies its indicated length of data in turn, repeating until completion of the full amount of data given by the size and type section 614 for each object. The last slice of a particular object may be shorter than the size given by the size and type section 614. In such a case, the last slice will correspond to the remaining total bytes to be delivered in the group 610, as indicated by the size and type section 614.

Reference numeral 626 is an exemplary interleaved slice data section for two objects. If the object count 612 indicates "1", there is only one object in the group 610 and only one slice of data of the length given by the single entry in the size and type section 614. These single object groups represent non-interleaved data, as described above.

The author may place objects or portions of objects into the choreography groups 610 by means of the user-interface. By placing an object into the same choreography group as another object, the author directs that those objects will be delivered interleaved together. Consequently, those interleaved objects will appear progressively over the same duration during the file download. Objects placed in later choreography groups will appear in time after objects placed in earlier groups. The data for a particular object may be placed in different choreography groups to create, for example, the effect of having only the initial splashes of images appear early in the document, followed by the text of the document in a later group, and finally by the remainder of the image data in even later groups.

Figure 7:
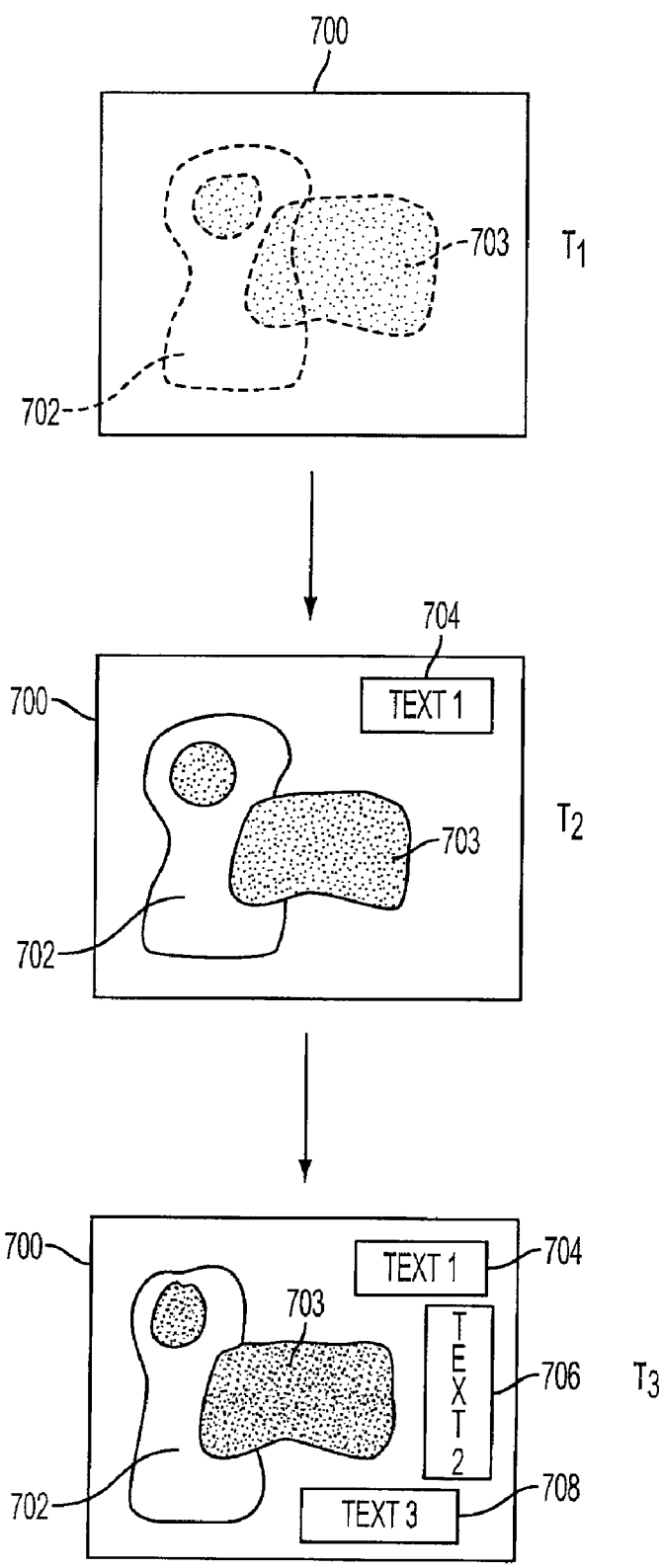
FIG. 7 shows an example of choreography of a document.

An example of choreography for an ARTDOC document 700 is shown in FIG. 7, which illustrates three displays of the document 700 over time. In this embodiment, portions of the entirety of the ARTDOC document 700 can be sent simultaneously. A first part of the ARTDOC document 700 is displayed at time $T_1$ as a "splash" of all images 702 and 703. This is followed by a second part of the document 700 at time $T_2$, including more information about the images 702, 703 as well as text part 1 704. Time $T_3$ shows the final ARTDOC document 700, with completed images 702, 703, as well as additional text parts 2 and 3, 706 and 708, respectively.

If the user does not specify a particular choreography, a default organization will be provided. The default organization preferably groups objects from top to bottom as they appear in the ARTDOC document. Moreover, in the default, objects that are located roughly near one another may be placed in the same group to ensure that they will be delivered together.

Figure 8:
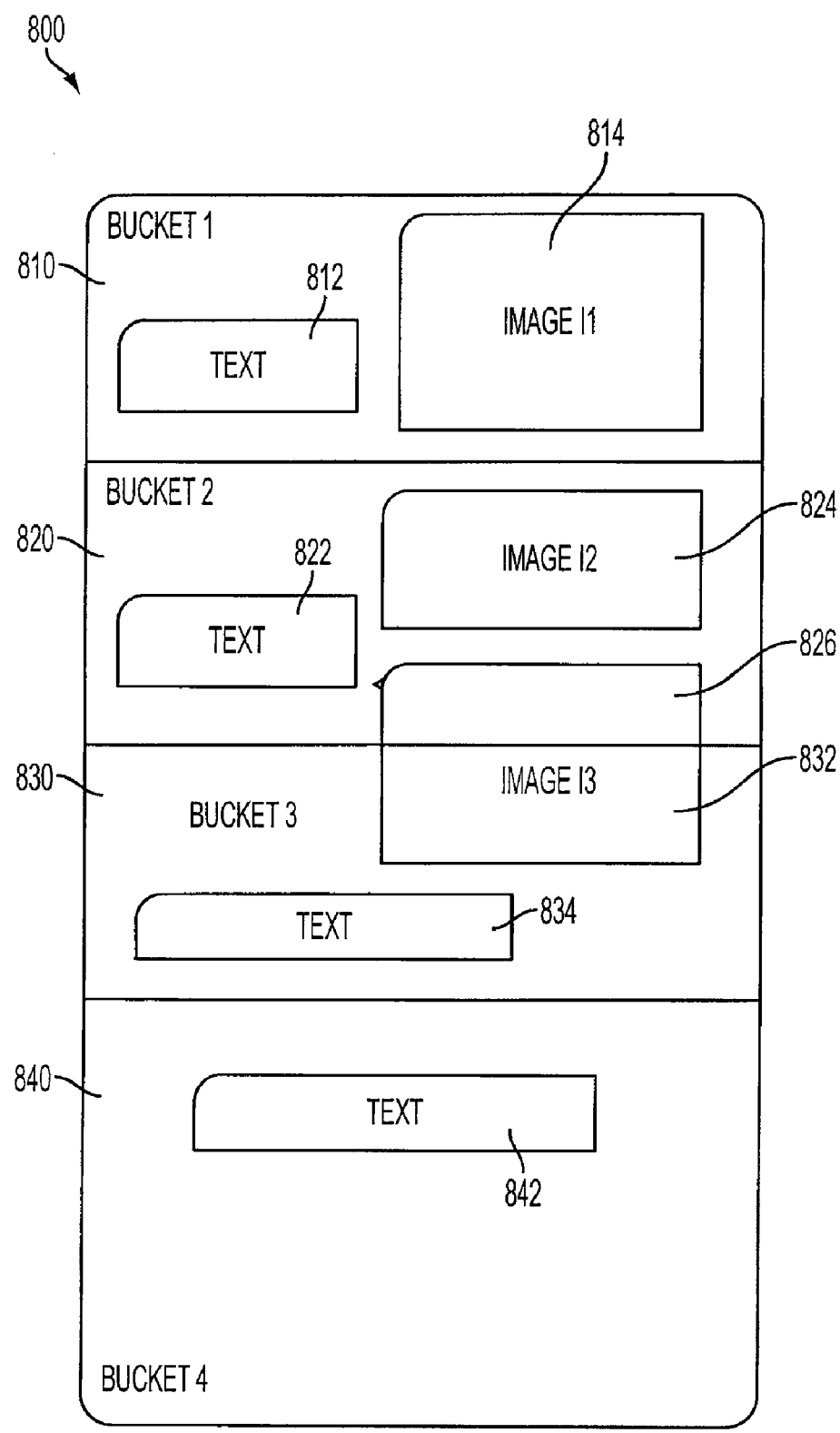
FIG. 8 shows the default method for organizing a document of the present invention.

FIG. 8 illustrates the default method for organizing an ARTDOC document 800. The ARTDOC document 800 is conceptually arranged into a number of areas, called "buckets." Each bucket can be a physical area on the ARTDOC document 800, or alternatively could be a portion of different areas on the ARTDOC document 800. FIG. 8 shows the ARTDOC document 800 being broken up into four physical sections—Section 1 810, Section 2 820, Section 3 830, and Section 4 840. Section 1 810 includes both text 812 and an image I1 814. Section 2 820 includes text 822 and an image I2 824, as well as a portion 826 of image I3. Section 3 830 includes another portion 832 of image I3 and some text 834. Section 4 840 includes only text 842.

Each of these sections 810, 820, 830, 840 is treated as a bucket, and each bucket represents an area on the ARTDOC document 800. Each bucket is analyzed to determine slice sizes that make sense. An appropriate slice should be big enough to alter the perception presented to the user, but small enough to enable simultaneous occurrence of events.

Bucket 1 (i.e., Section 1 810) has two objects including the text portion 812 and image I1 814. Bucket 2 (i.e., Section 2 820) has three objects, the text 822, the image I2 824, and the portion 826 of image I3. Bucket 3 (i.e., Section 3 830) has two objects, the other portion 832 of image I3 and the text 834, and Bucket 4 (i.e., Section 4 840) has only one object, the text 842. Therefore, the system of the present invention includes multiple areas forming the ARTDOC document 800.

The integrated file format of the present invention allows all parts of the image to be received in sequence. The sequence can be set by the author of the document being perceived. The sequence is also such that at least part of the sequence allows portions of the information in the document to be progressively received.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A method of streaming multimedia objects encapsulated into a multimedia document, the method comprising:
   receiving author specification of multimedia content and choreography information that indicates a temporal order for rendering the multimedia content, the multimedia content being defined by at least first, second, and third multimedia objects and the choreography information including a relative sequence specified by the author for rendering the first, second, and third multimedia objects, the relative sequence indicating that the first and second multimedia objects be rendered progressively together over a common time period and the third multimedia object be rendered subsequent to the rendering of the first and second multimedia objects;
   interleaving data slices of the first and second multimedia objects with each other and adding the interleaved data slices to a multimedia document;
   adding data slices of the third multimedia object to the multimedia document without interleaving the data slices of the third multimedia object with data slices of other objects in the multimedia document; and
   streaming the multimedia document to a recipient for rendering according to the choreography information, such that the data slices of the first and second multimedia objects are progressively rendered together during the common time period before all data slices of the first and second multimedia objects are received and the data slices of the third multimedia object are progressively rendered after the rendering of the first and second multimedia objects and only after a sufficient amount of the data slices of the third multimedia object are received to enable rendering of the third multimedia object.

2. The method of claim 1 wherein the data slices of the first, second, and third multimedia objects are progressively rendered substantially together.

3. The method of claim 1 wherein all of the data slices of the third multimedia object are progressively rendered before any of the data slices of the first and second multimedia object are progressively rendered.

4. The method of claim 1 wherein the data slices of the third multimedia object are rendered after all of the data slices of the first and second multimedia objects are rendered.

5. The method of claim 1 wherein the data slices of the first and second multimedia objects can be progressively rendered independent of bandwidth without degradation.

6. The method of claim 1 wherein the data slices of the third multimedia object cannot be progressively rendered independent of bandwidth without degradation.

7. The method of claim 1 wherein the data slices of the third multimedia object are rendered only after all of the data slices of the third multimedia object are received.

8. The method of claim 1 wherein the choreography information comprises an indication of the author's intent that the first, second, and third objects be rendered substantially together.

9. The method of claim 8 wherein the rendering of the first, second, and third objects is delayed until all of the data slices of the third object are received by the recipient.

10. The method of claim 1 wherein the first object comprises a text file.

11. The method of claim 1 wherein the first object comprises an image file.

12. The method of claim 1 wherein the second object comprises a text file.

13. The method of claim 1 wherein the second object comprises an image file.

14. The method of claim 1 wherein the third object comprises a sound file.

15. The method of claim 1 wherein the third object comprises a video file.

16. The method of claim 1 further comprising:
   detecting an object type of a detected object that contains at least a portion of the multimedia content; and
   determining, based on the detected object type, whether to interleave data slices of the detected object with data slices of another object of the multimedia document or whether to add the data slices of the detected object to the multimedia document without interleaving the data slices of the detected object with data slices of other objects of the multimedia document.

17. The method of claim 16 wherein the detected object is one of the first and second objects.

18. The method of claim 16 wherein the detected object is the third object.

19. The method of claim 1 further comprising rendering the multimedia document in a window on a computer display at the recipient.

20. The method of claim 19 wherein rendering the multimedia document further comprises:
   creating an exclusionary area within the window; and locating an item within the exclusionary area, the item being selected from a group of objects including a framed image, a slide show, framed text, sound data, a separator, or a hyperlink.

21. The method of claim 1 wherein the multimedia content includes splash image data defining a splash image, the method further comprising locating the splash image data within the multimedia document such that the splash image is rendered on a computer display at the recipient as the splash image data is received by a receiver coupled to the computer display.

22. The method of claim 1 further comprising providing each object with an address indicating a player that plays the object.

23. The method of claim 1, further comprising compressing data for at least one of the objects.

24. The method of claim 1 further comprising:
creating an unknown object in the multimedia document; and
locating player data within the unknown object defining a player that plays the unknown object.

25. The method of claim 1 wherein two or more of the objects have at least one common attribute, including at least one of a command for perception of the objects, an ability to pass and receive a message, and an ability to supply and retrieve the data embodied in the objects.

26. The method of claim 1 wherein the multimedia document forms a code segment that receives image information; and wherein the image information is used to construct an image frame for a framed image that is part of the multimedia document.

27. The method of claim 26 wherein the framed image has an image data format; and wherein a decoder determines the image data format and encapsulates the framed image with the image frame.

28. The method of claim 1 wherein the choreography information further comprises:
a header;
an object archive for storing information about one or more of the objects, the object archive including information about the relationship of the objects with the document; and
a multiplex section including data for the objects in the document.

29. The method of claim 28 wherein the multiplex section further includes:
an object number counter indicating the number of objects;
a plurality of object descriptions, each object description describing a corresponding one of the objects; and
a choreography group providing information about a first group of objects.

30. The method of claim 29 wherein the choreography group further comprises:
a group object counter indicating the number of objects in the choreography group;
size and type data for each object;
header data; and
the data slices of objects that are interleaved together or the data slices of an object that is not interleaved with other objects.

31. The method of claim 29 further comprising a non-multiplex section following the multiplex section, the non-multiplex section including one or more separate objects that are not played by a player as the separate object files are received by a receiver.

32. The method of claim 1 in which the temporal order is independent of a recipient input.

33. The method of claim 1 in which the temporal order is independent of a recipient hardware configuration.

34. The method of claim 1 in which the temporal order is independent of a recipient software configuration.

35. The method of claim 1, wherein the media content is rendered independent of an author-specified bandwidth to be used to send the multimedia document.

36. A computer implemented device for streaming multimedia objects encapsulated into a multimedia document, the device comprising instructions for:
receiving author specification of multimedia content and choreography information that indicates a temporal order for rendering the multimedia content, the multimedia content being defined by at least first, second, and third multimedia objects and the choreography information including a relative sequence specified by the author for rendering the first, second, and third multimedia objects, the relative sequence indicating that the first and second multimedia objects be rendered progressively together over a common time period and the third multimedia object be rendered subsequent to the rendering of the first and second multimedia objects;
interleaving data slices of the first and second multimedia objects with each other and adding the interleaved data slices to a multimedia document;
adding data slices of the third multimedia object to the multimedia document without interleaving the data slices of the third multimedia object with data slices of other objects in the multimedia document; and
streaming the multimedia document to a recipient for rendering according to the choreography information, such that the data slices of the first and second multimedia objects are progressively rendered together during the common time period before all data slices of the first and second multimedia object are received and the data slices of the third multimedia object are progressively rendered after the rendering of the first and second multimedia objects and only after a sufficient amount of the data slices of the third multimedia object are received to enable rendering of the third multimedia object.

37. The device of claim 36 further comprising instructions for progressively rendering the data slices of the first, second, and third multimedia objects substantially together.

38. The device of claim 36 further comprising instructions for progressively rendering all of the data slices of the third multimedia object before progressively rendering any of the data slices of the first and second multimedia objects.

39. The device of claim 36 further comprising instructions for progressively rendering the data slices of the third multimedia object after progressively rendering all of the data slices of the first and second multimedia objects.

40. The device of claim 36 wherein the data slices of the first and second multimedia objects can be progressively rendered independent of bandwidth without degradation.

41. The device of claim 36 wherein the data slices of the third multimedia object cannot be progressively rendered independent of bandwidth without degradation.

42. The device of claim 36 further comprising instructions for rendering the data slices of the third multimedia object only after all of the data slices of the third multimedia object are received.

43. The device of claim 36 further comprising instructions for:

detecting an object type of a detected object that contains at least a portion of the multimedia content; and determining, based on the detected object type, whether to interleave data slices of the detected object with data slices of another object of the multimedia document or whether to add the data slices of the detected object to the multimedia document without interleaving the data slices of the detected object with data slices of other objects of the multimedia document.

44. The device of claim 36 further comprising instructions for rendering the media content independent of an author-specified bandwidth to be used to send the multimedia document.

45. A method of streaming multimedia objects encapsulated into a multimedia document, the method comprising:

receiving author specification of multimedia content and choreography information that indicates a temporal order for rendering the multimedia content, the multimedia content being defined by at least first, second, and third multimedia;

interleaving data slices of the first and second multimedia objects with each other and adding the interleaved data slices to a multimedia document;

adding data slices of the third multimedia object to the multimedia document without interleaving the data slices of the third multimedia object with data slices of other objects in the multimedia document;

streaming the multimedia document to a recipient for rendering according to the choreography information, such that the data slices of the first and second multimedia objects are progressively rendered before all data slices of the first and second multimedia objects are received and the data slices of the third multimedia object are progressively rendered only after a sufficient amount of the data slices of the third multimedia object are received to enable rendering of the third multimedia object;

detecting an object of a detected object that contains at least a portion of the multimedia content; and determining, based on the detected object type, whether to interleave data slices of the detected object with data slices of another object of the multimedia document or whether to add the data slices of the detected object to the multimedia document without interleaving the data slices of the detected object with data slices of other objects of the multimedia document.

46. The method of claim 45 wherein the detected object is one of the first and second objects.

47. The method of claim 45 wherein the detected object is the third object.

* * * * *